United States Patent [19]
Moran et al.

[11] Patent Number: 5,519,853
[45] Date of Patent: May 21, 1996

[54] METHOD AND APPARATUS FOR ENHANCING SYNCHRONOUS I/O IN A COMPUTER SYSTEM WITH A NON-VOLATILE MEMORY AND USING AN ACCELERATION DEVICE DRIVER IN A COMPUTER OPERATING SYSTEM

[75] Inventors: Joseph P. Moran, Santa Clara; Russel P. Sandberg, San Francisco; Donald C. Coleman, Piedmont, all of Calif.

[73] Assignee: Legato Systems, Inc., Palo Alto, Calif.

[21] Appl. No.: 235,755

[22] Filed: Apr. 29, 1994

Related U.S. Application Data

[63] Continuation of Ser. No. 31,048, Mar. 11, 1993, Pat. No. 5,359,713.
[51] Int. Cl.$^6$ .............. G06F 13/10; G06F 13/14
[52] U.S. Cl. .............. 395/550; 395/494; 395/463; 364/DIG. 1
[58] Field of Search .............. 364/DIG. 1; 395/494, 395/463, 550, 489, 493

[56] References Cited

U.S. PATENT DOCUMENTS

| | | | |
|---|---|---|---|
| 4,636,946 | 1/1987 | Hartung et al. | 395/463 |
| 4,779,189 | 10/1988 | Legvold et al. | 395/493 |
| 4,916,605 | 4/1990 | Beardsley et al. | 395/489 |

*Primary Examiner*—Tod R. Swann
*Assistant Examiner*—James Peikari
*Attorney, Agent, or Firm*—Townsend and Townsend and Crew

[57] ABSTRACT

An acceleration device for enhancing the speed of synchronous writes in a computer system includes a novel control subsystem, in one embodiment a device driver, and stable storage having an access time on the same order of magnitude as the access time of the main memory in the computer system. In one embodiment, the novel device driver is interposed in the operating system of the computer between the proprietary kernel and one or more peripheral storage unit device drivers. The novel device driver intercepts I/O commands, for example, synchronous write commands, from the operating system that are intended for one of the peripheral storage unit device drivers and subsequently copies the data specified in the write command from main memory of the computer to the stable storage of the acceleration device. The stable storage is operated as a cache and upon one of a set of predetermined conditions being satisfied, selected data stored in the stable storage are transferred, i.e., flushed to the appropriate peripheral storage device using the device driver for that storage device. The set of predetermined conditions includes user commands and the charge of the battery supplying power to the stable storage becoming low.

20 Claims, 9 Drawing Sheets

Microfiche Appendix Included
(2 Microfiche, 178 Pages)

METHOD AND APPARATUS FOR ENHANCING SYNCHRONOUS I/O IN A COMPUTER SYSTEM WITH A NON-VOLATILE MEMORY AND USING AN ACCELERATION DEVICE DRIVER IN A COMPUTER OPERATING SYSTEM

This is a continuation of application Ser. No. 08/031,048 filed Mar. 11, 1993, now U.S. Pat. No. 5,359,713.

CROSS REFERENCE TO MICROFICHE APPENDIX

Appendix A, which is a part of the present disclosure, is a microfiche appendix consisting of 2 sheets of microfiche having a total of 178 frames. Microfiche Appendix A is a listing of computer programs and related data in one embodiment of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to the I/O operations in a computer system, and more particularly to enhancing synchronous I/O operations to a peripheral storage device which is coupled to the computer system.

2. Description of the Prior Art

Many different computing systems are available today but most of these systems are built around fundamental components such as those illustrated in FIG. 1. Typically the fundamental components of a computer 20, include a central processing unit 10 (CPU) which is connected through an input bus 11 to an input module 12 and through an output bus 13 to an output module 14. CPU 10 is also connected through data buses 15, 16 to a memory unit 17.

CPU 10 provides control and computing functions. Input and output modules 12, 14 are used to communicate between the computer user and CPU 10. Input module 12 supplies information to CPU 10. Typical input devices are a keyboard and a mouse. Output module 14 displays information from central processing unit 10. Typical output modules include a video display monitor, a printer and other visual display means such as plotters. Input module 12 and output module 14 are frequently referred to as input/output (I/O) units.

Memory unit 17 typically contains two general types of information, computer programs and data. A computer program is a sequence of instructions that are executed by the computer to perform a specific function. Data in memory unit 17 are processed by CPU 10 in response to the instructions from a computer program which is executing in CPU 10. The elapsed time required for a computer to complete the sequence of instructions in a program is the execution time of the program.

Memory unit 17 typically includes mass memory 17A, sometimes called secondary memory, and main memory 17B. Main memory 17B is a relatively fast memory, i.e. a typical access time is in the range from 20 to approximately 400 nanoseconds. Access time is the time interval between when CPU 10 requests data from memory 17 and when memory 17 makes the requested data available to CPU 10. Main memory 17B is usually used to store at least a portion of the program currently being executed by CPU 10 and data required by this program. Mass memory 17A, such as disks and tapes, is used to store programs, data, or portions of either programs and data which are not needed immediately by the CPU or that cannot be accommodated in main memory 17B because of size limitations of main memory 17B. Since programs and/or data are transferred in and out of mass memory 17A at the direction of CPU 10, mass memory units are typically included in the generic term "I/O units."

Mass memory 17A, is significantly slower than main memory 17B. Access time for mass memory is typically on the order of tens of milliseconds. Hence, if mass memory is accessed frequently by a program, the execution time for the program is limited by the mass memory access time.

In addition to speed, main memory 17B and mass memory 17A are typically differentiated by their response to a power failure. Main memory 17B usually consists of dynamic random access memory (RAM). RAM is volatile, which means the state of the RAM can be lost, for example if power is lost to the computer, or the computer crashes. Conversely, mass memory is usually non-volatile. Non-volatile memory, sometimes called "stable storage," is memory that maintains its state when power is interrupted. Ideally, computer programs and data are placed in mass memory 17A for permanent storage and moved into main memory 17B only for execution. As used herein, a computer crash means that the main memory is either corrupted or lost, independent of the crash initiator. Crash initiators include, for example, a power loss, a defective disk drive or a bug in the computer operating system.

Computer 20, as illustrated in FIG. 1, is typically a single unit. However, some I/O modules are quite expensive and often are not used sufficiently by a single user to justify their expense. In addition, when data is contained on a device in a single computer, the data is not directly accessible by other users who may need the data. Networks of computers are formed, as shown in FIG. 2, wherein several computers 20-1 to 20-N, usually similar to computer 20 illustrated in FIG. 1, are coupled to a common computer 21 commonly called the server. Server 21 is in turn connected to peripheral devices which may be accessed by computers, 20-1 to 20-N, sometimes called workstations, through network 22. Network 22 may be, for example, an Ethernet network, which is defined by IEEE 802.3 specification. Such a network permits common usage of data files as well as I/O devices which are connected to server 21.

In general terms, a computer operating system is used to control the operation of CPU 10 (FIG. 1), main memory 17B and I/O modules 12 14, 17A. In addition, the operating system provides an interface between computer user applications and the hardware. As used herein, hardware refers to the physical components of a computer system.

An operating system is ideally implemented as a software system, because a software system provides the greatest degree of flexibility, as discussed more completely below, for any additions and/or modifications to the operating system. As used herein, software refers to a computer program.

The operating system of a computer typically includes a kernel which (i) creates user processes, as described below, (ii) schedules execution of user processes, (iii) provides user processes with system services, and (iv) services hardware interrupts and exceptions.

The definition of a "user process" requires an understanding of the sequence of steps by which user source code, i.e., a computer program, is transformed into a series of instructions for CPU 10. User source code for an application program, which is to be run on a computer using a particular operating system, is typically compiled and linked into a binary file which is known as an executable image. A "user process" is the execution of an executable image by the kernel of the operating system. In the UNIX operating system (UNIX is a registered trademark of AT&T Bell Laboratories), for example, compilers, I/O utilities and terminal command interpreters are implemented as user processes.

An operating system for a network includes not only the operating system as described above for a single computer, but also additional software that coordinates the operation of the workstations and the server with respect to shared resources. The operating system for either a computer in a network or a standalone computer is usually loaded into main memory 17B when the computer is booted. As used herein, "booted" refers to the sequence of operations that are performed when either power is first applied to the computer or the computer is reset.

In either a network of computers or a standalone computer, the operating system must interface CPU 10 (FIG. 1) and main memory 17B with I/O modules 12, 14, 17A connected to CPU 10. To facilitate coupling of I/O modules 12, 14, 17A to CPU 10, the operating system typically includes at least one device driver for each type of I/O module that is normally connected to CPU 10. A device driver is a part of the kernel of an operating system, and provides a well-defined interface to the proprietary portion of the operating system. For example, a disk driver interfaces the proprietary portion of the operating system with a disk controller which in turn drives a disk. Note that a controller and a disk may be supplied by different vendors. Thus, the disk vendor designs the controller to interact with the disk driver in the operating system and as a result, the disk is easily connected to any computer using the operating system.

The operating system kernel may include device drivers for the secondary memory, the input modules and the output modules for example. Many operating systems (such as UNIX, VMS, a registered trademark of Digital Equipment Corp., MS-DOS, a registered trademark of Microsoft Corp., and OS-2, a registered trademark of International Business Machines, Inc.) are written so that a user may interface new devices to the CPU by supplying a device driver, i.e., a computer program for the new device, which can be incorporated in the operating system executable image.

To install a new device driver in the operating system kernel, the user must often write the device driver in the computer language of the operating system kernel and compile the new device driver into an object module which is subsequently linked with the operating system kernel executable image. To implement the new kernel, the executable image must be loaded and booted in the computer. However, some systems allow a device driver to be loaded into a running kernel. Thus, a computer operating system can be considered as consisting of two parts: (i) a proprietary part, sometimes called the proprietary kernel, which constitutes the bulk of the operating system and in fact controls the CPU; and (ii) a configurable part, which allows users to add device drivers to the operating system kernel.

In a network, the proprietary kernel, as used herein, includes network operating software. Thus, the operating system kernel includes network control code as part of the proprietary kernel. For example, in a network of computers operating under a version of UNIX containing Sun Microsystem's Network File System (NFS), NFS supplies file access to many client machines on the network while UNIX controls the individual client machines. NFS is designed to provide access to files over the network. Client machines with no disk can access remote files transparently using NFS. Client machines with a local disk can use NFS in addition to their local disks to gain access to remote files. To the client machines, NFS files are accessed in the same way as local files.

Independent of the ability to develop customized device drivers for I/O modules, the execution speed of a program with a standalone computer or a network is usually limited by I/O operations because, as discussed above, the actual operational speed of mass memory 17A is significantly slower than the operational speed of CPU 10 and main memory 17B. Several different approaches have been attempted to enhance the perceived and/or operational speed of mass memory so as to enhance the overall performance of the computer system.

Disk accesses on the average appear faster by using main memory as a cache. For example, if a file residing on a disk is accessed, a copy of the file is kept temporarily in a main memory cache. Subsequent accesses to the file are made to the main memory cache. Thus, the subsequent accesses are performed at main memory 17B access speeds rather than at disk access speeds. However, main memory storage is much more expensive per byte than disk storage, and other demands will be placed on main memory so the file cannot remain permanently in main memory. Eventually, the file must be returned to the disk and the memory reclaimed.

This caching strategy works perfectly as long as no modifications are made to the file, because the copy in memory and the copy on the disk are the same. However, if the file is modified (written), the copies in memory and disk may differ. For example, assume that a file on disk contains the data shown below:

| Disk | Memory |
| --- | --- |
| A | |
| B | |
| C | |
| D | |

When the file is read, a copy of the file is brought into memory:

| Disk | Memory |
| --- | --- |
| A | A |
| B | B |
| C | C |
| D | D |

Thus, initially the copy on disk and the copy in memory are the same. The next time this file is read, the file is read from memory at a fast rate. If a change is subsequently made to the file, i.e., replacing the "B" with an "X", the copy of the file in memory and the copy of the file on disk are now different.

| Disk | Memory |
|------|--------|
| A | A |
| B | X |
| C | C |
| D | D |

Subsequent reads of the file access the modified data in memory at a fast rate. However, if the computer crashes main memory 17B is either corrupted or lost. When the computer is restarted after a crash, the contents of the disk are the only version of the data available. Thus, the file does not contain the "X" but rather the "B".

The UNIX file system tries to reduce the problem associated with a computer crash by periodically writing, i.e., flushing, the contents of the main memory cache back to disk. However, if a crash occurs between flushes, the data entered in the main memory cache after the last flush is lost.

In a network operating under UNIX and NFS, the server through NFS supplies file access to many client machines. Since a crash of the server (the machine providing the access to the files on disk) could destroy the work of many clients, NFS uses a stateless protocol to make recovery after a computer crash simple. A stateless protocol is one in which each update to a file is done synchronously. That is, when an update occurs, the update is written through to the disk—there is no inconsistent copy in memory. If the server should crash before an update occurs, the client simply continues to send the data to the server. Once the server has been repaired, the data are accepted, the client is told that the data were accepted, and the client can continue. If the server should crash after an update occurs, but before the client heard that the update happened, the client still tries to send the data until it is assured that the data is safely on the disk. When the server is repaired, the client writes the same data again. This is not a problem, since writing the same data two or more times is equivalent to writing the data once.

To illustrate the operation of NFS, consider the previous example again. Initially, the data on disk and in memory after the initial access were:

| Disk | Memory |
|------|--------|
| A | A |
| B | B |
| C | C |
| D | D |

As described above, subsequent reads of the data now take place at memory speeds, rather than disk speeds. A client replaces the "B" with an X. When the client sends the "X", the X is copied to both memory and disk, as shown below, so that all copies of the data are consistent.

| Disk | Memory |
|------|--------|
| A | A |
| X | X |
| C | C |
| D | D |

Hence, if there is a crash, the updated data is safely stored on the disk. When the crash is repaired, the correct copy of the data is on disk.

NFS is not the only application that benefits from this kind of caching. Database applications may also perform synchronous writes to disk to ensure this kind of reliability with respect to computer crashes. Unfortunately, the synchronous writes, which are used to preserve data integrity, degrade the speed performance of the computer system. In fact, if the data is updated frequently in comparison to the number of reads of the data, the synchronous writes cause the performance to approach that of a system without the cache.

Another approach for increasing the performance of secondary memory has been to replace the high density storage of a disk with less dense non-volatile memory. Non-volatile memory is typically RAM with an uninterruptable power supply, e.g., batteries. For example, in a RAM disk, non-volatile memory is substituted for the disk. The replacement RAM disk provides high performance, but the RAM disk is a very expensive disk. A RAM disk made with volatile memory will lose the stored information if power to the memory is inadvertently interrupted. Finally, the high cost of RAM limits the storage capacity of a RAM disk.

Another approach to enhancing the speed performance of secondary memory is to use a non-volatile memory cache on disk controllers. When writes are issued to a disk attached to such a controller, the data first go into the non-volatile memory cache on the disk controller. Later, the written data are flushed from the controller's non-volatile memory cache to the actual disk. Since the controller is not part of the computer operating system, the controller cannot use knowledge the operating system has about when caching is beneficial. For example, a read-only filesystem will not benefit by non-volatile write caching. However, since the controller cannot tell anything about the filesystem, the controller caches all requests for the entire disk, including those for a read-only filesystem. Thus, the controller non-volatile memory cache is used wastefully. Further, the controller only speeds up requests for disks attached to the controller and cannot help amortize the cost of the expensive stable storage among different disks attached to different controllers.

Finally, many subtle issues with respect to data integrity are difficult to address without interacting with the computer operating system. A disk controller that has no special interaction with the operating system cannot, for example, flush the non-volatile memory under operating system control. If the computer system is brought down to repair a disk attached to the controller, any valid data still remaining in the non-volatile memory must be flushed prior to the repair or that data will be lost. A manual interaction with the controller must be used to flush any such data rather than having the operating system shutdown procedure initiate the flush.

The IBM 3990 disk controller is another example of a controller which possesses non-volatile memory. However, this memory is not used as a cache, and the controller does not have software support for recovery after a crash. Further, the operation of the non-volatile memory is not transparent to a user because specific channel commands must be issued to access this memory.

Another approach to maintaining data integrity during a computer crash is to modify the operating system to include transaction support. Conceptually, in a transaction support system, the operating system stores a group of operations in a transaction log. The computer performs the group of operations in the transaction log only after all operations in the group are completely entered in the transaction log. The transaction log is maintained in stable storage, typically a non-volatile memory.

If the computer crashes before the group of operations is completely written from the log to the disk, the group of operations can be restarted when the computer is restarted.

If the transaction log was not completed prior to the crash, no operations are done and the log will be reset. This atomic "all or none" property is crucial to transaction systems.

Operations with filesystems can also use transaction support to simplify error recovery. Since data in a file are stored as a description block plus data blocks, updating the description and data blocks atomically ensures that the file is maintained in a consistent state. The IBM RT computer uses this technique. While these methods provide for enhanced recovery after a crash, they do not function as a cache and may require special operations to use the non-volatile memory.

Thus, the problems associated with the slow access speed of secondary memory and data integrity following computer crashes have not been satisfactorily solved. A main memory cache provides enhanced performance for accesses to data that are normally maintained in mass memory, but when using synchronous writes which bypass the main memory cache to protect against crashes, the system performance suffers. RAM disks also provide enhanced performance, but the expense of RAM limits the applications of these substitute disks. A stable storage cache in a disk controller only benefits the performance of disks connected to the controller. Further, since the controller is not a part of the computer operating system, the cache is inefficient and special procedures must be developed to prevent loss of data from the cache upon removal of a disk connected to the controller. A means for enhancing the performance of accesses to secondary memory which includes the speed performance of a main memory cache and the protection of synchronous writes against crashes is currently not available.

SUMMARY OF THE INVENTION

The acceleration device of this invention provides a means for enhancing synchronous I/O access to secondary memory in a computer system by providing a means for caching the synchronous I/O request in a time period on the same order of magnitude as main memory access times while maintaining the protection of synchronous writes against computer crashes. In one embodiment, the acceleration device includes (i) a stable storage means having an access time on the same order of magnitude as the main memory of the computer system in which the acceleration device is installed, and (ii) a control means that synchronously stores data provided by the computer operating system in a stable storage means, and subsequently retrieves data from the stable storage means. The data is retrieved from the stable storage means either when the operating system issues a read request for the data or when any predetermined condition from a set of predetermined conditions is satisfied. When a predetermined condition is satisfied, the data retrieved from the stable storage means is transferred to, i.e., flushed, to the appropriate peripheral storage device which is coupled to the computer system. Thus, the acceleration device does not replace a peripheral storage device as did the prior art RAM disks, but rather the acceleration device functions as an intermediate temporary stable storage device.

In one embodiment, the control means includes an acceleration device driver for the stable storage that is interposed in the computer operating system between the proprietary kernel and at least one peripheral storage unit device driver which in turn interfaces the proprietary kernel to at least one peripheral storage unit controller. The acceleration device driver intercepts selected I/O commands to the peripheral storage unit device driver and synchronously performs the operations corresponding to the commands using the high speed stable storage. Hence, prior art synchronous I/O from main memory to relatively slow peripheral storage device is replaced according to the principles of this invention by a synchronous data transfer from one high speed memory to another high speed memory.

Since I/O commands are accelerated only for filesystems which benefit from the high speed memory transfer, the high speed stable storage is used more effectively than, for example, the non-volatile memory in prior art disk controllers. Also, the acceleration device is under the control of the operating system so that, for example, when a peripheral device is going to be shut down, the operating system, through the acceleration device driver, flushes all data in the stable storage of the acceleration device to the peripheral device. Accordingly, the acceleration device, unlike prior art disk controllers, does not require special manual intervention to flush the stable memory prior to removing a peripheral device.

In one embodiment, the acceleration device uses the stable storage as a high speed memory cache. As the high speed memory cache becomes full (one of the predetermined conditions), selected data, for example, the least recently used data, are written from the stable memory to the appropriate peripheral storage unit using the device driver for that peripheral storage unit. Hence, the peripheral storage unit device driver operation is identical to the operation previously performed by that device driver, but now the data is taken from stable storage rather than main memory. Thus, the operation of the acceleration device is transparent to the user. No changes are required in either the user's computer programs or the user's files.

No data that was successfully written to stable storage is lost, unless the user explicitly directs the acceleration device to reinitialize the stable storage through a reset. Thus, computer crashes, independent of the crash initiator, and peripheral storage unit error conditions do not result in loss of data from the acceleration device stable storage. Any data that was successfully written to the stable storage is maintained in the storage until the data can be successfully flushed to the appropriate peripheral storage unit. Thus, the acceleration device of this invention provides caching of synchronous I/O commands which is robust with respect to computer crashes.

According to the principles of this invention, a method for enhancing synchronous I/O operations in a computer includes (i) transferring data specified in selected synchronous I/O operations from the main memory of the computer to a stable memory, which has an access time on the same order of magnitude as the access time of the main memory; and (ii) transferring a selected portion of the data from the stable memory to an appropriate storage unit upon any one condition of a set of predetermined conditions being satisfied.

In one embodiment, this method includes using a device driver, which is included in the operating system of the computer, for transferring the data. This device driver is interposed in the operating system so that only I/O commands for selected filesystems on peripheral devices, i.e., selected synchronous I/O commands, are intercepted by the device driver. In this method, the enhancement of the synchronous I/O operations for the selected filesystems are achieved without any modifications to the user filesystems or user software.

DETAILED DESCRIPTION

Figure 1:
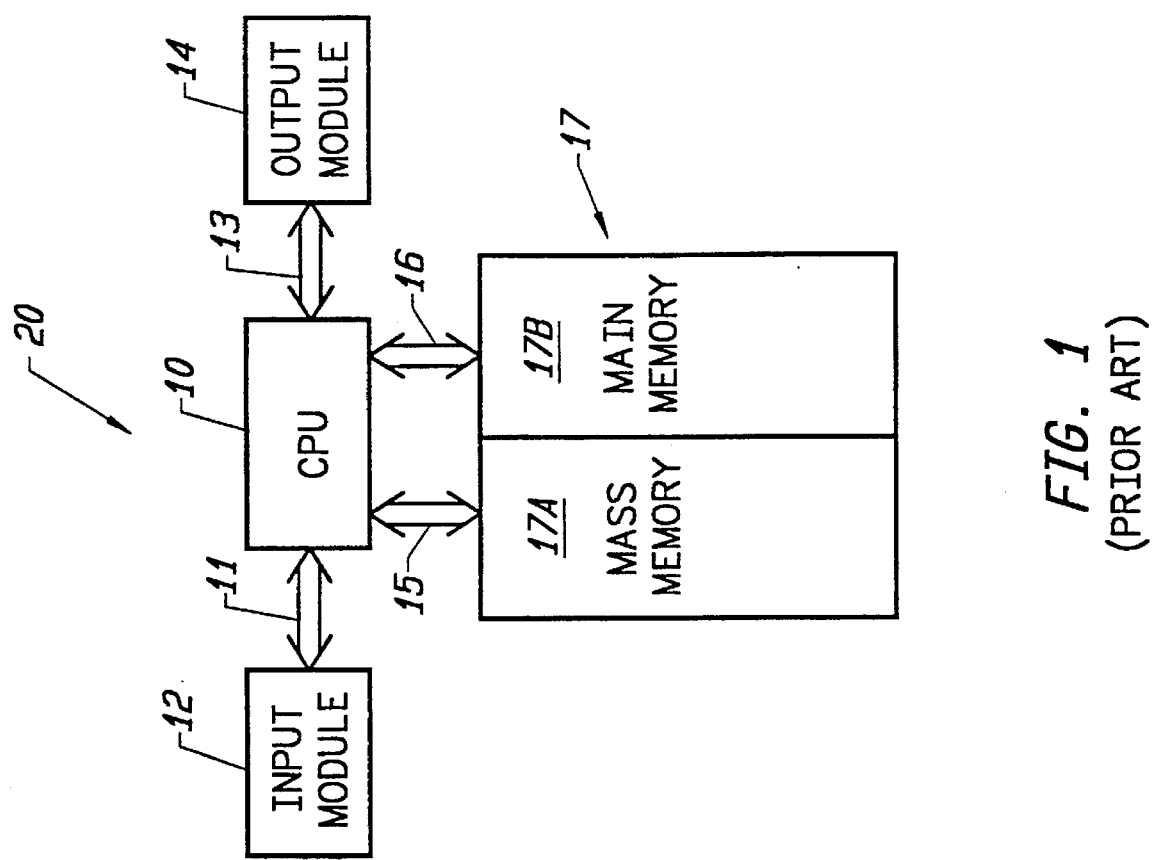
FIG. 1 illustrates the fundamental components in a prior art computer.
Figure 2:
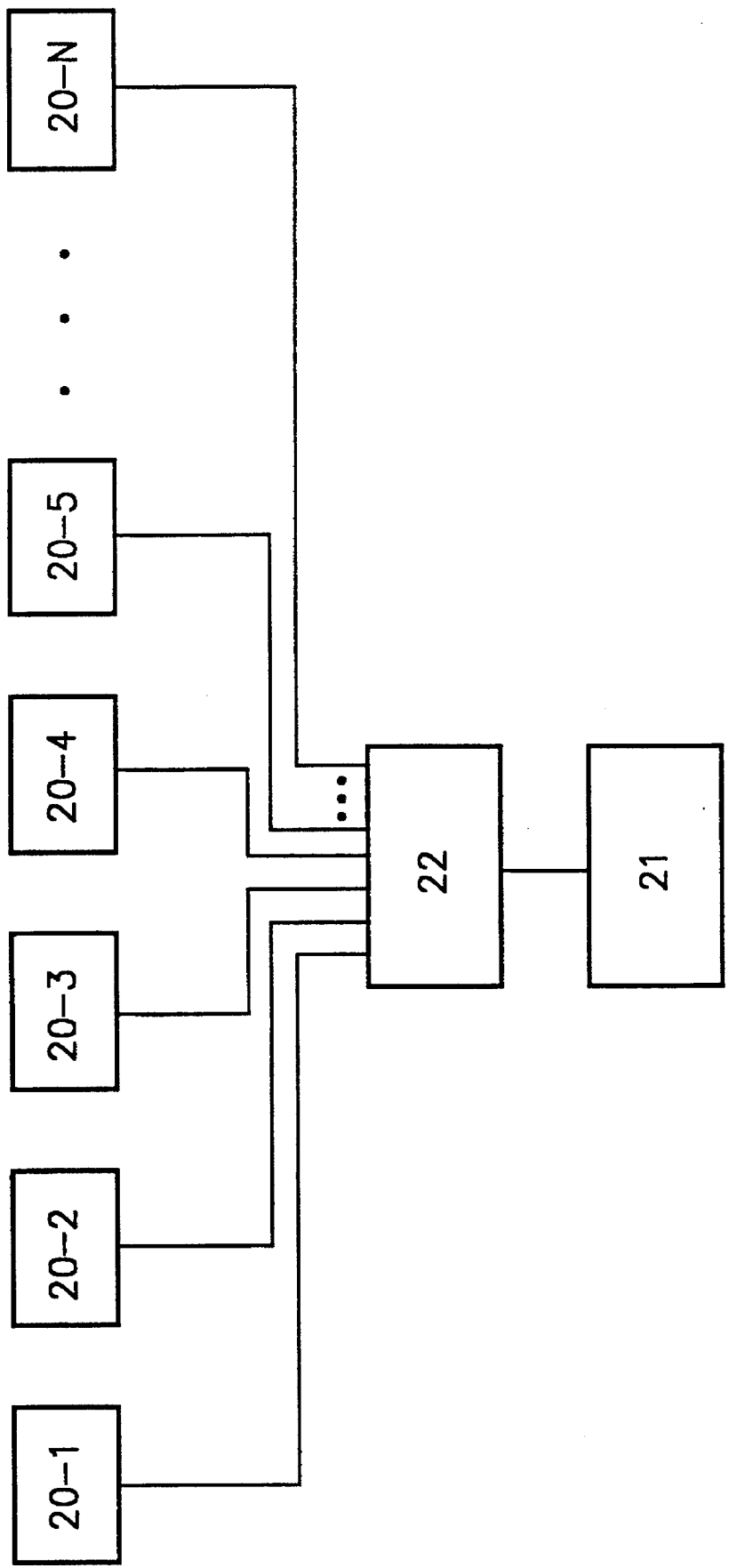
FIG. 2 illustrates a prior art computer network consisting of interconnected computers of FIG. 1.

When the accelerated synchronous input/output (I/O) device of this invention (the acceleration device) is installed in any computer having (i) a CPU, (ii) a main memory, (iii) an operating system including a proprietary kernel and device drivers, and (iv) secondary memory, selected accesses to secondary memory are replaced with accesses to stable storage which has an access speed similar to that of the main memory. In one embodiment, the acceleration device includes (i) an acceleration device driver which is incorporated in the operating system kernel and (ii) stable storage.

In one embodiment, the acceleration device driver for the stable storage is interposed in the computer operating system between the proprietary kernel and at least one device driver which in turn interfaces the proprietary kernel to at least one controller for a peripheral I/O device. The acceleration device driver intercepts selected I/O commands to the peripheral device driver and synchronously performs the operations corresponding to the I/O commands using the high speed stable storage. Hence, the prior art synchronous write from main memory to the peripheral storage device is replaced by a synchronous transfer from one high speed memory, main memory, to another high speed memory, i.e., the high speed stable storage. As used herein, the phrase "high speed memory" refers to memory having an access time on the same order of magnitude as the access time for RAM in the main memory of a computer, while the phrase "slow speed device" or similar expressions refer to a device having an access time on the same order of magnitude as the access time of peripheral storage devices such as disks.

In one embodiment, as described more completely below, the acceleration device uses the stable storage as a high speed memory cache. As the high speed stable memory cache becomes full, data is written from the stable memory to a peripheral storage device using the device driver in the operating system for that peripheral storage device. Of course, other predetermined criteria, as explained below, can also be used for transferring data from the high speed stable memory to peripheral storage devices.

Thus, according to the principles of the invention, a synchronous I/O operation in a computer is accelerated by replacing the prior art synchronous I/O operation from a high speed main memory to a low speed peripheral device with a fast synchronous I/O operation from the high speed main memory to the high speed stable storage.

If the fast synchronous I/O operation is a synchronous write, the subsequent disposition of the data copied from main memory to the high speed stable storage depends upon the subsequent I/O operations on that data. If a read request is issued for that data, the data are copied from stable storage to main memory. Therefore, a read access to the low speed peripheral device has been eliminated.

Similarly, if the data are rewritten, the new data is copied from main memory over the old data. In this case, the first write and the second write of the data eliminated at least two write accesses to the peripheral storage device. As explained more completely below, in one embodiment, this operation, in fact, saved at least four and perhaps six write accesses to the peripheral storage device.

Finally, in one embodiment, if the high speed stable storage subsequently becomes either full or reaches another predetermined condition, such as those described below, the least recently used data are flushed from high speed stable storage to the appropriate peripheral storage device. Hence, when the data, written by the write command, become the least recently used data, the data are flushed from high speed stable storage. Computer operation is significantly enhanced by this caching of synchronous I/O operations over the prior art methods, described above, for improving access to mass memory.

Another alternative solution to using synchronous write to slow mass memory for crash protection was to connect an uninterruptable power supply (UPS) to computer system 20. (FIG. 1). The UPS gives the computer time to flush main memory to disk if power fails. To add a UPS to a computer system, the operating system must be modified (i) to detect low power and (ii) to place the computer in a consistent state upon detection of low power. However, even if this detection and placement is successful, the UPS may not provide sufficient power to successfully flush main memory since a UPS has a limited capacity. In addition, use of a UPS does not resolve data integrity problems associated with other crash initiators such as either a software failure, which may make it impossible to flush main memory to disk, or a hardware failure such as a transient hard disk problem. In contrast, as described more completely below, the acceleration device of this invention provides caching of synchronous writes. The integrity of data written to the non-volatile memory is maintained following a computer crash until the data are successfully flushed to the appropriate peripheral device.

Unlike the prior art RAM disks, the acceleration device of this invention does not replace a disk, but rather functions as an intermediate temporary high speed storage device. Since the disk is not replaced, the size of the stable memory in the acceleration device does not have to provide storage space equivalent to the disk. Also, in one embodiment, the acceleration device of this invention is incorporated into the operating system, as described more completely below, so that only selected I/O commands and the related operations are processed by the acceleration device.

Figure 3:
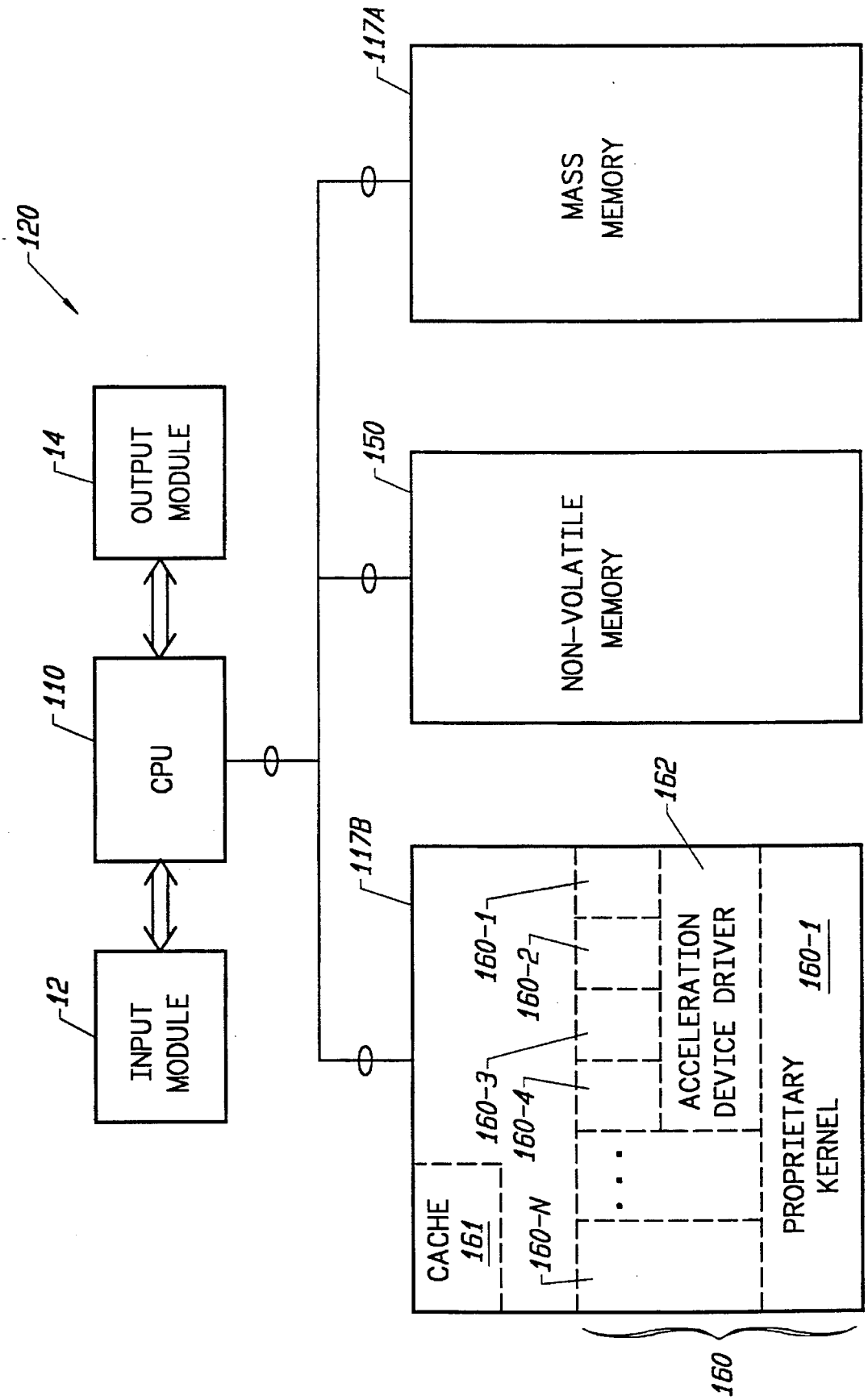
FIG. 3 illustrates a computer including In one embodiment, the acceleration device of this invention.

One embodiment of this invention is shown in FIG. 3. A computer 120 includes a CPU 110, a main memory 117B, a non-volatile memory 150 and a secondary memory 117A. In main memory 117B are stored the computer operating system 160 and a cache 161. The computer operating system includes (i) the proprietary kernel 160-1, previously described, (ii) a plurality of device drivers 160-1 ... 160-N for peripheral storage devices, which comprise secondary memory 117A, and (iii) the unique acceleration device driver of this invention 162 for non-volatile memory 150.

Read and write operations between secondary memory 117A and main memory 117B of computer 120 originally functioned, as described above, for a computer on a NFS network. Specifically, data read from secondary memory 117A were stored in main memory cache 161 so that subsequent reads of the data were from cache 161 rather than secondary memory 117A. Therefore, subsequent read operations were performed at main memory access speeds rather than secondary memory access speeds. Similarly, in computer 120, prior to installation of the acceleration device of this invention, all NFS and explicitly synchronous write operations to peripheral storage devices were synchronous so that data integrity was maintained during a computer crash.

In computer 120 (FIG. 3), write commands to peripheral storage devices, previously specified by the user, are intercepted by acceleration device driver 162. For example, as shown in FIG. 3, device drivers 160-1 to 160-4 function through acceleration device driver 162. While in this embodiment, four peripheral storage unit device drivers are coupled through acceleration device driver 162 to the proprietary kernel 160-1, the number of coupled peripheral storage unit device drivers is illustrative only and is not intended to limit the scope of the invention. According to the principles of this invention, the user can couple any number of peripheral storage unit device drivers through acceleration device driver 162.

When acceleration device driver 162 intercepts a synchronous write, data are essentially copied from main memory 117B to non-volatile memory 150. Selected data blocks are subsequently written from non-volatile memory 150 to secondary memory 117A using a set of predetermined conditions, described more completely below. The peripheral storage unit device drivers 160-1 to 160-4 are used to write the selected data blocks from non-volatile memory 150 to the selected peripheral storage devices. Information is stored in each data buffer in non-volatile memory 150 which identifies the peripheral device driver to be used in flushing the data buffer to a peripheral storage device.

Hence, the peripheral storage unit device driver operation is identical to the operation previously performed by the device driver except now the data is taken from non-volatile memory 150 rather than main memory 117B. The non-volatile memory must first be copied to a regular memory buffer if the peripheral storage unit device driver cannot directly transfer non-volatile memory to the peripheral storage unit. Thus, the operation of the acceleration device is transparent to the user. No changes are required in either the user's programs or the user's files. The user sees only the enhanced performance associated with the acceleration device.

In this embodiment, main memory cache 161 and the operating system efficiently handle I/O commands for read-only filesystems. Therefore, primarily synchronous write commands are processed by the acceleration device of this invention so that the write operations are performed at main memory speeds. This selective response to specified I/O commands is possible because the acceleration device driver is a part of the operating system kernel and therefore can operate upon specified filesystems. Asynchronous writes are also accelerated in some cases, but the performance benefit may be less pronounced than in the synchronous case.

In contrast, the prior art disk controller with a non-volatile memory cache moved all data through the cache even though access time was not improved for read-only filesystems in a computer such as that illustrated in FIG. 3. Also, the controller non-volatile memory cache only enhanced the performance of disks connected to the controller. In contrast, the acceleration device of this invention can be interposed between the proprietary operating system kernel and any device driver for secondary memory 117A.

Normal operating system read requests still access main memory cache 161. However, if data requested by a read was not in main memory cache 161 but the requested data was recently written into non-volatile memory 150, the read request retrieves the data from non-volatile memory 150. In this case, non-volatile memory 150 appears as a very fast disk to the operating system and such "read hits" transfer the data from non-volatile memory 150 to main memory cache 161.

Therefore, while the above embodiment primarily accelerated only synchronous write operations, the principles of this invention are also applicable to read operations or other commands associated with accessing secondary memory. For example, in a computer operating system which did not use a memory cache, both read and write operations would be enhanced by the acceleration device of this invention.

The actual implementation of this invention depends upon the computer operating system used with the invention. Each computer operating system, which includes a proprietary kernel and means for including device drivers with the proprietary kernel, has a specification for the interface between a device driver and the proprietary kernel and the interface between the device driver and the peripheral device controller. One embodiment of this invention using the UNIX operating system with NFS is described below. This embodiment is illustrative only and is not intended to limit the scope of the invention to the embodiment described. In view of this disclosure, those skilled-in-the-art can implement this invention using other operating systems.

Microfiche Appendix A, incorporated herein by reference, includes (i) a program listing for the acceleration device driver of this invention, (ii) administration tools code, (iii) installation code for the acceleration device driver, (iv) window-based acceleration device monitoring code and (v) complete installation and reference documentation. The material in Microfiche Appendix A is for use in a Sun Microsystems' machine with a VMEbus interface and a non-volatile memory board.

One machine suitable for use with this invention is a Sun 3/160, which is sold under Part No. 3/1605-P2 by Sun Microsystems, Inc. of Palo Alto, Calif. A suitable non-volatile memory board is a static RAM-based VMEbus memory card with lithium batteries. A non-volatile memory board having these characteristics is available from Micro Memory, Inc. of Chatsworth, Calif. under part No. MMI 6704-C. Examples of peripheral devices are a Xylogics 451 disk controller available from Xylogics, Inc. of Burlington, Mass., and a CDC Sabre SMD disk available from Control Data Corp. of Minneapolis, Minn. The specific components cited are only illustrative of components suitable for use with the acceleration device of this invention and are not intended to limit the scope of the invention to the particular components.

Under UNIX, two types of device drivers are encountered, block drivers and character drivers. Block device drivers provide an interface whereby user requests of arbitrary size are packaged into buffers of fixed maximum size. Character device drivers provide an interface whereby user requests of a constrained size are accessed directly from user memory, i.e., a region in main memory 117B, without intermediate buffering. UNIX provides a standard way to bind physical disks attached to a computer to filenames. Normal files, e.g., program files and data files, are accessed through the block device interface. That is, a strategy routine provided by the device driver for the disk is used to perform the I/O to that disk.

Strategy routines are provided by device drivers in many operating systems, and in UNIX, the strategy routine is typically called with a pointer to a data structure that describes the buffer and the block to be written or read. The data structure is generally referred to as the "buf" structure. Fields in the buf structure completely define the requested I/O operation. The buf structure includes the device to be used, the direction of the data transfer, the size of the data transfer, the memory and device addresses, a pointer to the data, and other information used by the kernel to maintain the block buffering cache of UNIX.

The strategy routine is not required to execute I/O commands in the order they are received. The I/O command can be processed either synchronously or asynchronously. Typically, the strategy routine orders the requests in a queue of outstanding work. For example, the strategy routine in a disk driver typically orders requests by track number so that the disk heads sweep smoothly across the disk.

A raw device driver is used when direct access to a disk is desired without incurring the buffering overhead associated with a block device driver. In a raw device driver, read and write routines ultimately use the strategy routine, such as the strategy routine described more completely below, to access the disk. Individual raw device drivers can select their own buffering strategies. The read and write routines monitor whether the raw device is busy. If the device is not busy, these routines operate directly with the device, but if the device is busy, the operation waits until the device is free.

The acceleration device driver of this invention includes both a block driver and a raw driver. The acceleration block device driver is interposed between the proprietary operating system kernel and the selected block device drivers for peripheral storage devices, sometimes called peripheral storage units, while the acceleration raw device driver is interposed between the proprietary operating system kernel and the selected raw device driver for peripheral storage devices. The program routines in the acceleration block device driver include routines called close and strategy. The names of these routines, which are presented in Microfiche Appendix A and incorporated herein by reference, are used for UNIX device drivers.

All the routines in the acceleration device drivers and other code in Microfiche Appendix A are written in the C programming language because the UNIX operating system is written in C. The important aspect is that the acceleration device drivers must be written in a computer language such that the acceleration device drivers can be included in the operating system kernel.

The strategy routine for the acceleration block device driver includes operations and information equivalent to those in the strategy routine discussed above as well as operations for managing non-volatile memory 150 (FIG. 3), which are described more completely below. The close routine, which is given in Microfiche Appendix A, is equivalent to the close routine for other device drivers.

When a peripheral device is removed from the computer system (e.g., for repair), the system administrator "unmounts" the device. Normally, the unmount command invokes the peripheral device close routine. However, if the accelerator block device driver has been interposed between the operating system and the peripheral device driver, the accelerator block device driver close routine is invoked. This close routine flushes data from non-volatile memory 150 to the peripheral device that is being closed and then issues a close command to the device driver for that peripheral device. Since non-volatile memory 150 may contain data that has not been transferred to the peripheral device being unmounted, it is critical that the peripheral device be made consistent by flushing non-volatile memory 150 to the device prior to removal of the device. We define a "dirty" buffer to be one which contains valid data which has not yet been flushed from non-volatile memory 150 to a disk, for example. Thus, the data copy in the buffer and the data copy on disk may differ until the dirty buffer is flushed to disk.

The acceleration raw device driver includes read and write routines, equivalent to those of the general raw device drivers, described above. Again, the routine names are based upon standard UNIX nomenclature. The read and write routines both flush any data referenced in a raw I/O request from non-volatile memory 150 to the peripheral storage unit (disk) before passing data to the device driver for the peripheral storage unit. The write routine also invalidates the referenced data in non-volatile memory 150 since after the write completes, the cached data may be incorrect. This is necessary because otherwise programs using raw I/O and programs using block I/O would get different results, and some UNIX utilities would not work correctly. However, no buffering of raw I/O requests is performed in non-volatile memory 150. Thus, the benefits of this invention are not currently available to users of raw I/O.

Nevertheless, some software packages require the use of character devices. The performance of such software packages is not enhanced by the embodiment of the invention in Microfiche Appendix A. However, following the principles of this invention an acceleration device driver including a character driver that performed synchronous writes to stable storage could be developed for use with such software packages.

To add the acceleration device driver, both the raw device driver and the block device driver, to the kernel of the UNIX operating system requires several changes to the non-proprietary part of the kernel. In one embodiment, an administration code, such as that shown in Microfiche Appendix A, makes the necessary changes to the software which is subsequently used to generate the new kernel which includes the acceleration device drivers. The changes are based upon information, described below, which is supplied by the user.

Figure 4:
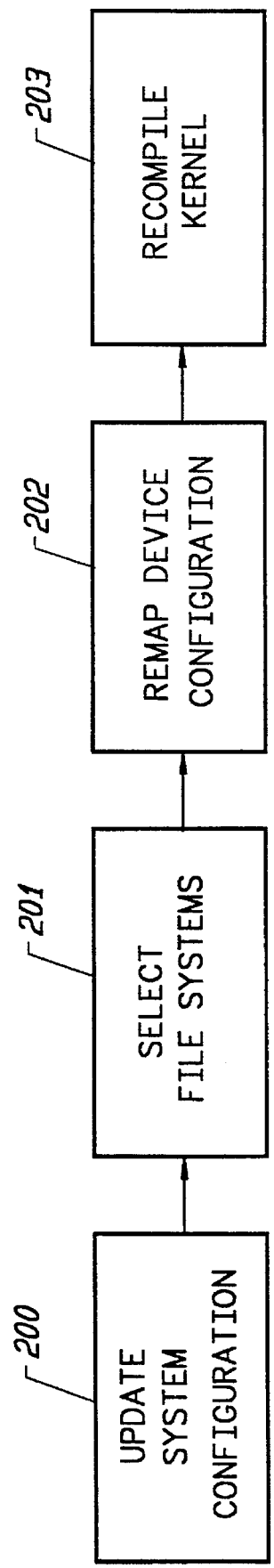
FIG. 4 illustrates the process of generating a new operating system kernel that includes the acceleration device drivers of this invention.

As illustrated in FIG. 4, the addition of the acceleration device drivers to the UNIX operating system kernel requires, as described more completely below, four steps: 1) update system configuration 200; 2) select filesystems for acceleration 201; 3) remap device configuration 202 and 4) recompile the kernel 203. In one embodiment, an installation program, which is provided in Microfiche Appendix A and incorporated herein by reference, performs these steps using information provided by the user.

In update system configuration 200, the UNIX system configuration file is modified. The entries in the UNIX system configuration file describe devices, such as controllers, that are accessed by the operating system in response to user commands. Therefore, to add stable storage 150, i.e., the non-volatile memory, to the devices accessed by the operating system requires adding information about non-volatile memory 150 to the system configuration file as well as other information that characterizes the acceleration device. Specifically, the memory address and the memory size for stable storage 150 are entered. In addition, the location of status registers, which are used to obtain battery status and non-volatile memory board identification information, is specified. Thus, in this embodiment, two devices are added: one for non-volatile memory 150; and another for status information.

Next, in select filesystems for acceleration 201, the filesystems to be processed by the acceleration device of this invention are identified. In the BSD UNIX file system, a list of filesystems is typically maintained in the file /etc/fstab. Thus, filesystems in the file /etc/fstab are edited and selected file systems are associated with the acceleration device drivers. In one embodiment, the device driver notation in the filesystem identification is changed from lower case characters to upper case characters.

According to the principles of this invention, only those filesystems that experience accelerated performance are enabled for acceleration by an administrative command to the acceleration device driver. Since UNIX uses a cache for read operations, as described above, read-only filesystems are not enabled for acceleration, for example, because the UNIX cache provides a means for high speed access to such filesystems. Therefore, enabling read-only filesystems for the acceleration device driver would result in redundant caching and consequently less effective caching in non-volatile memory 150.

Figure 5:
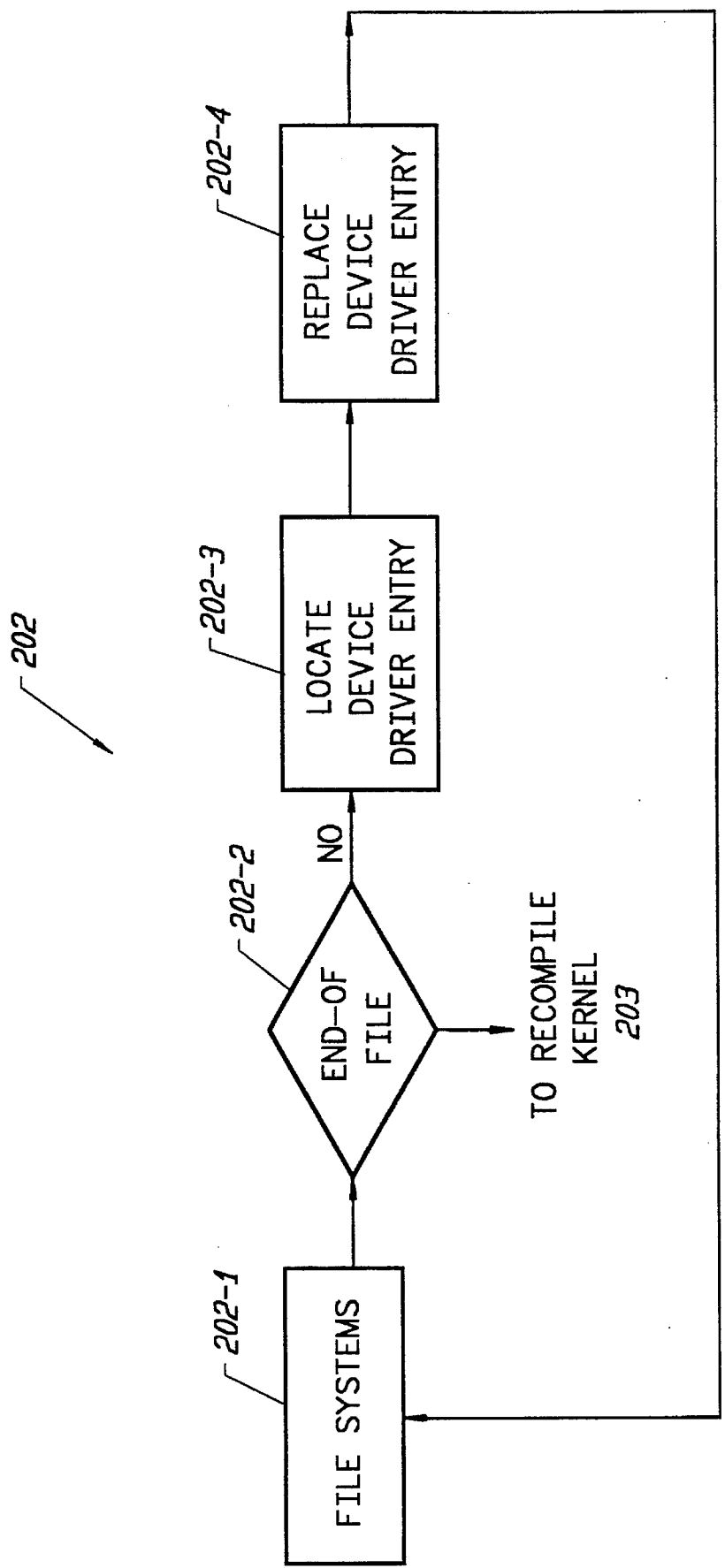
FIG. 5 illustrates the basic steps in the remap device configuration process step of FIG. 4.

In remap device configuration 202, the acceleration device drivers are interposed between the device drivers for the peripheral devices containing the filesystems selected in select filesystems for acceleration 201 and the proprietary kernel of the operating system. The operations in remap device configuration 202 are illustrated in FIG. 5.

Filesystems 202-1 is a list of the filesystems selected for acceleration by select filesystems 201. Each entry in filesystems 202-1 is sequentially processed in remap device configuration 202. Thus, end-of-file check 202-2 determines whether an entry in filesystems 202-1 remains for processing. If an entry exists in filesystems 202-1 for processing, processing transfers to locate device driver 202-3.

Locate device driver entry 202-3 examines the UNIX filesystem to ascertain the device driver associated with the filesystem being processed. After locate device driver 202-3 determines the device driver associated with the filesystem, replace device driver entry 202-4 stores the entry point to the appropriate acceleration device driver, block or raw, in place of the entry point for the device driver that was associated with the filesystem. In addition, replace device driver entry 202-4 enters the original device driver entry point in an acceleration device driver table so that when the acceleration device driver flushes the filesystem from non-volatile memory 150 (FIG. 3), the device driver for the peripheral device originally associated with the filesystem is accessed and used for the flush.

In the embodiment illustrated in Microfiche Appendix A, a new source file is generated along with a replacement routine for the original device driver. The replacement routine will invoke the acceleration routine and in turn the acceleration routine uses the table to locate the peripheral device when flushing of non-volatile memory 150 is needed.

Specifically, a data structure (table) is built which contains information about the entry points of the original device drivers. This data structure is used to locate the correct device driver when flushing a buffer from non-volatile memory 150 (FIG. 3) to disk, for example. This data structure also contains information about the status of each disk for which the driver has been coupled through the acceleration device driver to the operating system kernel. Specifically, the data structure includes information about whether a disk is currently in an error state, is actively flushing buffers, or is enabled at all.

In replace device driver entry 202-4, the "bdevsw" and "cdevsw" tables in file conf.c are also modified to point at the routines from step 202-3 which select the acceleration device drivers of this invention.

After replace device driver entry 202-4 is complete, processing returns to the filesystems 202-1 and the next entry in filesystems 202-1 is processed by steps 202-2 to 202-4 as described above. After the last entry in filesystems 202-1 is processed, end-of-file test 202-2 passes control to recompile kernel 203 (FIG. 4). At this point, new routines that dispatch normal operating system commands for selected peripheral devices to the acceleration device of this invention have been generated.

Recompile kernel 203 follows the procedure specified for adding new device drivers to the operating system kernel which is supplied by the licensor of the operating system. Specifically, the new code generated above and the code for the acceleration device drivers are compiled and subsequently linked with the executable image of the operating system kernel to produce a new executable image of the operating system that includes the acceleration device drivers. The code included in Microfiche Appendix A automatically performs this step for the user.

At this point, the new kernel has been modified so that the original entries into the peripheral device drivers (i.e., read, write, etc.) now point to routines in the acceleration device driver. When a filesystem selected in select filesystems for acceleration 201 (FIG. 4) is bound to a peripheral device driver (in UNIX, via the mount command), the operating system automatically uses the acceleration device drivers. The new routines inserted in the device configuration table call the acceleration device drivers, which in turn ultimately call the peripheral device driver.

No changes to any client programs are needed since files are accessed in the same manner as before the acceleration device drivers were added to the operating system kernel. The only difference is that a new device driver, the acceleration device, has been inserted between user commands and the peripheral device driver controlling the disk associated with the user's files. If the acceleration device is disabled for any reason, the acceleration device driver can still pass through requests to the original device driver. Thus, in error situations associated with the acceleration device, the computer system need not stop all activity to a disk. Instead, the system merely loses the performance of the acceleration device until repairs can be made.

In the recompilation step 203 (FIG. 4), other changes are made to the operating system kernel in addition to those described above.

The reboot system call in the system call entry point table (init_sysent.c in BSD UNIX) of the operating system kernel is replaced with a new routine that (i) flushes stable storage 150 (FIG. 3) to disk whenever the computer system is shut down, and (ii) then calls the original reboot routine. Typically, system network administrators explicitly shut down the computer system before replacing hardware. The normal ways of shutting down the computer system all invoke the reboot system call. The acceleration device handles recovery from an unexpected crash by flushing buffers from stable storage 150 when the "attach" routine is called at system initialization time, as described below.

The acceleration device of this invention includes two separate devices, stable storage 150 and special status registers which indicate the status of the acceleration device. These registers contain battery status information and board identification information. Each of these devices must have a device driver in the operating system which includes "probe" and "attach" routines, as required by BSD UNIX. When the operating system is initialized, the operating system queries the probe routine in the device driver. A probe routine returns a non-zero value (actually the device size), if the device associated with the driver is physically present in the computer.

The attach routine is called if the probe routine is successful and the attach routine is used to initialize data structures, as described more completely below, and to check error conditions when the system is rebooted. The "probe" and "attach" routines for stable memory 150 and the special status registers are also included in Microfiche Appendix A and incorporated herein by reference.

Figure 6:
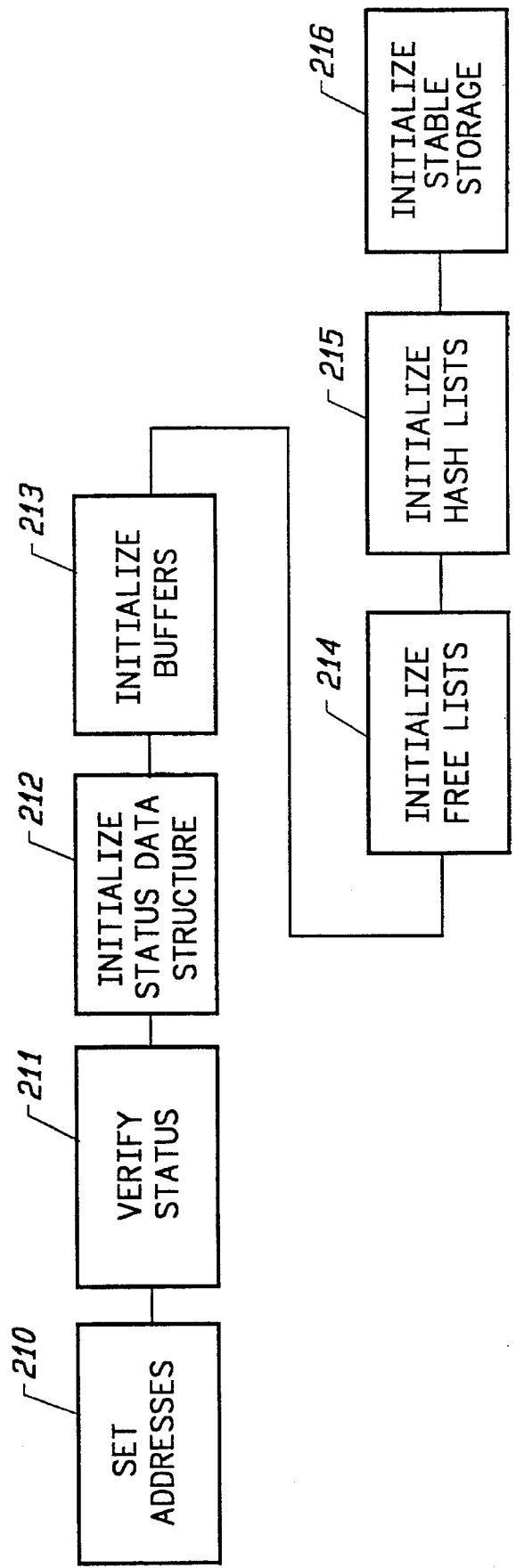
FIG. 6 illustrates the initialization of the acceleration device of this invention.

The initialization of the acceleration device achieved by the probe and attach routines is shown as a block diagram in FIG. 6. The initialization process is initiated by the operating system calls to the probe routines for the special status register and stable storage 150, respectively. In response to the query of the probe routines by the operating system, both of the probe routines indicate that the related device, i.e., non-volatile memory 150 (FIG. 3) and the status registers, are present.

In addition, in set addresses 210 (FIG. 6), the probe routine for the special status registers obtains the address for the status registers of the acceleration device from the operating system and sets a first global variable in the acceleration device driver to the address of the status registers. Similarly, the probe routine for non-volatile memory 150 (FIG. 3) obtains the address for non-volatile memory 150 from the operating system and sets a second global variable in the acceleration device driver to this address. In addition, the non-volatile memory probe routine obtains the size of non-volatile memory 150. The operations performed by set address 210 (FIG. 6) provide easy access to the status of the acceleration device and allow the acceleration device drivers to locate the stable storage.

After set addresses 210, the attach routine for the acceleration device special status registers performs verify status 211 which determines (i) the battery status on the non-volatile memory board and (ii) whether the non-volatile memory board was previously installed in the computer. If the battery status verification indicates that the batteries are low, non-volatile memory 150 is flushed, i.e., the "dirty" data stored in memory 150 are written to the appropriate peripheral device and non-volatile memory 150 is not used. In this case, all I/O commands to the acceleration device drivers are passed directly to the appropriate device driver for a peripheral device. The test of whether the non-volatile memory board was previously installed in the computer is described more completely below in the discussion of MAGIC NUMBER of Table 2.

The non-volatile memory attach routine performs initialization of the status data structure 212 (FIG. 6). This data structure is used to help control the operation of the acceleration device, including battery status, state of the driver and statistics about the number of cache hits.

The structures required by the acceleration device drivers of this invention, which are not needed for flushing of data stored in non-volatile memory 150 (FIG. 3), are stored in main memory 117B of the computer system. The attach routine for the acceleration device non-volatile memory 150 also performs actions 213–216 in FIG. 6. Specifically, initialize buffers 213 defines the structure BUF RECORD, which is described more completely below, and then marks all the BUF RECORD structures invalid.

Initialize free list 214 sets the lists used by the acceleration device drivers to identify unused regions, i.e., buffers in non-volatile memory 150 to a known state. Similarly, initialize hash lists 215 sets the acceleration device drivers hash lists to a known state. The hash lists are used for fast access to a given buffer, which represents a block of data on a disk.

The above-operations are performed when the acceleration device of this invention is first installed in a computer as well as each time the computer is rebooted. However, the initialization of stable storage 216 (FIG. 6) depends upon whether the initialization is for the original installation of the acceleration device in a computer system or whether a computer system containing the acceleration device of this invention is being rebooted. If the non-volatile memory contains dirty data when a system is rebooted, a flag is set, as described more completely below, so that the dirty data is subsequently flushed from non-volatile memory 150 (FIG. 3), i.e., the valid data is flushed to the appropriate peripheral device. Non-volatile memory 150, as described below, is initialized only after all dirty data has been flushed.

In the original installation of the acceleration device of this invention, non-volatile memory 150 does not contain any valid data so that processing proceeds directly to initialization of non-volatile memory 150. The flushing of data from non-volatile memory 150 upon reboot is described more completely below in the description of how stable storage buffers in non-volatile memory 150 are flushed from memory 150 to a peripheral device.

In prior art computer 20 (FIG. 1) a request for reading or writing data to a disk or another peripheral device is delivered to the appropriate device driver in a standard package. In UNIX, this is the buf structure, discussed above. The buf structure contains a pointer to the data to be written, and specific information about the disk to which the data is to be written. The buf structure also contains some fields used to maintain the data structure itself, such as link fields. In computer 120 (FIG. 3), the acceleration block device driver retains the first two types of information, i.e., a pointer to the data to be written and specific information about the peripheral device to which the data is to be written, in stable storage 150. To economize on the use of non-volatile memory 150, data structures, such as buf record, described below, hash lists, and free lists are maintained in main memory 117B.

Non-volatile memory 150 is organized as shown in Table 1.

TABLE 1

| STABLE RECORD | { HEADER INFORMATION BUFFER DESCRIPTORS (MAXBUFS) DATA BUFFERS (NBUFS) } |
|---|---|

The header information in STABLE RECORD of Table 1 is shown in Table 2.

TABLE 2

| HEADER INFORMATION RECORD | { MAGIC NUMBER VERSION NUMBER MACHINE ID |
|---|---|

TABLE 2-continued

DATA STRUCTURE BOOKEEPING
INFORMATION
}

The MAGIC NUMBER field may be used to ascertain whether the acceleration device is being installed in a computer for the first time. After the initial installation of the acceleration device in a computer, the MAGIC NUMBER field is set to a predetermined value that will not occur when battery power is first applied to non-volatile memory 150. Thus, the MAGIC NUMBER field is used to determine whether the acceleration device is being installed for the first time or whether the system contains the acceleration device and is being rebooted.

VERSION NUMBER indicates the release level of the software used to store the data in non-volatile memory 150. The VERSION NUMBER is compared to the release level of the software used to create the current version of the acceleration device drivers in the operating system kernel. Since data structures may be inconsistent across releases for the acceleration device drivers, the acceleration device reinitializes if the software versions differ.

MACHINE ID is used to handle the situation when a user takes a non-volatile memory board containing valid data from one machine and plugs the board into a different machine. Since in this case, valuable data could be lost before being flushed back to the proper disk location, the acceleration device drivers refuse to overwrite the stable storage. The user must either first flush the data on the original machine or specifically request that any valid data be destroyed by specifying a "reset" for non-volatile memory 150.

The DATA STRUCTURE BOOKKEEPING INFORMATION includes the number of actual non-volatile memory buffers of a given size.

In the initialization of stable storage 216 (FIG. 6), the maximum number of buffer descriptors MAXBUFS (Table 1) is allocated. The maximum number of buffer descriptors MAXBUFS is a function of the maximum size of stable storage 150. Since, in one embodiment, each data buffer stored in stable storage 150 is about 8 Kbytes, the maximum number of buffer descriptors MAXBUFS is about 127 when stable storage 150 has about a 1 Mbyte capacity.

Each buffer descriptor describes the physical location of a data buffer. Thus, BUFFER DESCRIPTOR(1) describes which disk DATA BUFFER(1) is to be written on. Data buffers are allocated at initialization time. The number of data buffers allocated NBUFS (Table 1) depends on the actual size of stable storage 150. The data buffers cache the data destined ultimately for a peripheral storage device.

The buffer data structures of the acceleration device, which are maintained in main memory, are standard buffers, similar to those used by any peripheral device driver. A standard buffer contains an address field that indicates where in main memory the data to be read or to be written goes. In the data structures of the acceleration device (the BUF RECORD in Table 3), this field, the ADDRESS field, is initialized to point into a data buffer (TABLE 1) area in the stable storage structure. This use of the ADDRESS field depends upon the operating system and hardware allowing non-volatile memory to be addressed as normal memory. In systems that do not support this functionality, the ADDRESS field could represent the physical buffer address as opposed to the virtual address.

TABLE 3

BUF RECORD  {
            ADDRESS
            BUFFER DESCRIPTOR
            NEXT POINTER INTO CHAIN OF BUFS
            }

Standard data structure techniques for manipulating linked lists and hashed lists are used to access the buf records. Note that buf records are the data units normally passed to the peripheral device driver by the operating system kernel. When a buf record is given off to the peripheral device driver for a write operation, the buf record is added to an active list, which is managed by the strategy routine of the peripheral device driver, until the data pointed to by the buf record is written to the peripheral device. The peripheral device driver marks a buf record as done when the data has successfully been written to disk. At this time the buf record is placed at the end of the list of available buffers for the acceleration device drivers, i.e., the free list, described above with respect to FIG. 6. Since this buffer was recently accessed, placing the buffer at the end of the list makes it less likely that this buffer is reclaimed for a different block of data by flushing the data in the buffer to the appropriate peripheral device. This procedure implements a least recently used (LRU) caching strategy.

As previously described, the acceleration device of this invention receives write commands from the operating system kernel and in response to these commands synchronously copies the specified data from main memory 117B to stable storage 150. Stable storage 150 has a capacity of about 1 Mbyte in one embodiment. Thus, as stable storage 150 becomes full, buffers must be flushed from stable storage 150 to the appropriate peripheral storage device. However, at boot time and at other times, which are discussed below, stable storage 150 may also be flushed.

A number of variables are used to determine when and how much data to flush from stable storage 150. A first variable "write_percent" is the percent of dirty buffers (a dirty buffer is a buffer in stable storage 150 containing valid data which has not been flushed to the appropriate peripheral storage device) in stable storage 150 which are flushed back to disk when no free buffers are available in stable storage 150. In one embodiment, the variable "write_percent" is initialized to about two percent. A second variable "desnavail" is the desired number of free buffers in stable storage 150. In one embodiment, the variable "desnavail" is initialized to about five.

When the strategy routine issues a request for writing a buffer to stable storage 150, a third variable "prewritenum" is used. If there are fewer buffers available in the memory cache than the variable "desnavail", "prewritenum" buffers are flushed so as to make room for future requests from the strategy routine. In one embodiment, the variable "prewritenum" is initialized to about four. A fourth variable "reset-needed" is used to indicate when either all buffers in stable storage 150 are to be flushed, or all buffers associated with a given peripheral device are to be flushed. The final variable "read-only" indicates that all buffers are currently being flushed. No updates to non-volatile memory 150 are allowed, when "read-only" is set and consequently non-volatile memory 150 is treated as read-only.

As previously described, non-volatile memory 150 of the acceleration device, is operated as stable storage cache by the strategy routine, discussed below, of the acceleration block device driver. One of the important features of this invention is maintaining the integrity of data in non-volatile memory 150 and at the same time operating the stable storage as an efficient cache. This requires flushing of stable storage or flushing of selected buffers in stable storage under a wide variety of possible conditions. Hence, flushing of buffers from stable storage is a key element in maintaining the integrity of data in non-volatile memory.

The acceleration device has three types of flushes: (i) flushes of all buffers to a specific peripheral device; (ii) flushes of the entire stable storage to all associated peripheral devices; and (iii) flushes of a given range of buffers to a specific peripheral device. When flushing to a specific device, that device cannot be disabled until the flushing results in the error free transfer of all valid buffers for that device in stable storage 150. When the entire stable storage is being flushed, the read-only flag, defined above, is set, which causes written requests for access to the acceleration device strategy routine to treat the cache as read only, until all valid data are flushed from storage 150.

To assist in determining when to flush buffers from stable storage 150, three states, UP, DOWN and ERROR are defined for the acceleration device. The current state of the device is stored in the status data structure described above with respect to initialize status data structure 212 (FIG. 6).

On reboot of a computer system containing the acceleration device of this invention, any valid "dirty" data still in non-volatile memory 150 must be written back, i.e., flushed, to the appropriate peripheral device. To achieve the flushing, the "resetneeded" variable, described above, is set by the acceleration device non-volatile memory driver's attach routine to ensure that the "dirty" data is flushed at the proper time, since this cannot be reliably done at "attach time". After the flush is done, and the "resetneeded" variable is cleared, the acceleration device is then either in the DOWN state, if all data were successfully flushed and the batteries are ok, or in the ERROR state if some error occurred. The only time that valid data can be present on reboot of a system is after a power failure, a kernel crash (from either a software or hardware problem), or a real disk error on an acceleration device write back operation to that disk.

Specifically, at boot time the acceleration device starts in the DOWN state. If there are valid data buffers in non-volatile memory 150, as indicated by the information in buffer descriptors (Table 1), the read-only flag, i.e. the variable "read-only" defined above, is used to turn stable storage 150 into a read-only cache and the resetneeded flag, i.e. the variable "resetneeded" defined above, is turned on, i.e. set. All entry points to the acceleration block device driver check the resetneeded flag and if the resetneeded flag is turned on, i.e. set, the acceleration block device driver attempts to flush stable storage 150.

As long as the resetneeded flag is set, the acceleration device driver strategy routine searches stable memory for all valid buffers and flushes any valid buffer to the appropriate peripheral device by supplying the buffer to the device driver for that peripheral device. Recall that the buffer descriptor (Table 1) contains sufficient information to identify the location of the data in stable storage 150 and the peripheral device driver.

After successfully flushing all valid buffers found after a reboot, the acceleration device is in the DOWN state. In this case, stable storage is initialized as described above. However, if valid buffers cannot be flushed because of an error, the acceleration device enters the ERROR state and the read-only flag is TRUE. In the ERROR state with the read-only flag being TRUE, stable storage 150 is not used, and new I/O requests for stable storage are "passed through" to the appropriate peripheral device directly.

After boot time (i.e. after resetneeded is clear), a peripheral storage device may have data in stable storage 150 if and only if the peripheral storage device is enabled and if and only if the acceleration device is not in the DOWN state. The acceleration device may be taken DOWN if and only if all valid data buffers in non-volatile memory 150 are successfully flushed. A disk may be taken off line (closed) if and only if all valid data buffers in non-volatile memory 150 for that partition are successfully flushed. New write data may be stored in non-volatile memory 150 for a partition if and only if the read-only flag is not set. If the acceleration device is in the ERROR state, the read-only flag must be set.

When the acceleration device is in the UP state, the acceleration block driver devices caches all synchronous write requests to non-volatile memory 150. An administration command, which is processed by the raw device driver for accelerator device itself, is required to "turn the acceleration device on", that is put the accelerator device in the UP state. Buffers in non-volatile memory are asynchronously transferred to the appropriate peripheral devices as needed.

Normally, when the acceleration device is in the DOWN state, by definition there is no valid data in non-volatile memory 150. When the acceleration device is in the ERROR state, the only valid data in non-volatile memory 150 is valid data that cannot be written back to a peripheral device because of some peripheral device error. The acceleration device enters the ERROR state if either data which cannot be flushed to a peripheral storage device because of a peripheral storage device error or the battery voltage for non-volatile storage 150 is too low. When the acceleration device is in the DOWN or ERROR state, no data are stored in non-volatile memory 150 and all I/O requests are simply passed through to the appropriate peripheral device driver except in ERROR cases discussed elsewhere.

When a peripheral storage device error occurs, the acceleration device attempts to flush all data, i.e. buffers, in non-volatile memory for that storage device to the storage device and enters the ERROR state. If the acceleration device is manually toggled using the acceleration device administrative commands "UP" and "DOWN" while in the ERROR state, the acceleration device again attempts to flush any data in non-volatile memory 150 to see if the error condition that prevented the previous write back operation has been corrected (e.g., a disk is now back on line). If all data are successfully flushed, the acceleration device leaves the ERROR state and returns to its previous state.

If a buffer is written to stable storage 150 while the acceleration device is in the ERROR state and a "dirty" buffer is found which corresponds to the given buffer, the buffer in stable storage 150 is invalidated and an attempt is made to write the buffer directly to the appropriate peripheral storage device.

The asynchronous nature of writes to a peripheral device may result in a failure to detect a peripheral device error condition until some time after a buffer for that device is stored in non-volatile memory 150. For example, the first time a buffer was written by the operating system, the buffer was successfully placed in non-volatile memory 150. Hence, the write system call that initiated the I/O succeeded. Subsequently, the disk to which this buffer would be transferred developed an error. When the acceleration block device driver attempts to pass this buffer to the device driver for the bad disk, the error is detected. If the disk is still in an error state, the next I/O request passed to the acceleration device for that disk fails immediately and no caching is attempted. The procedures for handling errors are discussed more completely below with respect to the strategy routine of the acceleration block device driver.

When the system is shutdown cleanly using the reboot system call (normally from the administrative commands shutdown, halt or reboot), the acceleration device enters the DOWN state so that all valid data in non-volatile memory 150 are flushed back to the appropriate peripheral storage devices. Hence, if the computer system is subsequently powered down, the non-volatile memory board can be pulled from the system without taking part of the contents of a peripheral storage device attached to the system in non-volatile memory 150.

No data that was successfully written to non-volatile memory 150 is lost, unless the user explicitly directs the acceleration device driver to reinitialize the memory through a reset. The reset command should only be used when there is a fatal disk error and the data in non-volatile memory 150 is no longer of importance.

As previously described, a peripheral device driver strategy routine processes all I/O requests for the peripheral device. For example, a disk drive strategy routine is passed a buf record, as described above, as a parameter. A field in the buffer descriptor part of buf record (i) indicates whether the buffer is to be read or written, (ii) contains information about which peripheral storage device is to be used, and (iii) says which block on that device is to be written. The acceleration block device driver strategy routine intercepts I/O calls to selected peripheral device driver strategy routines, based upon the reconfiguration of the operating kernel, described above.

If an I/O request is a read request, the acceleration device strategy routine examines the chain of buf records for the acceleration device, which are stored in main memory 117B (FIG. 3), as described above, to determine whether the requested data is stored in non-volatile memory 150. If the requested data is found in the chain of buf records, the acceleration block device driver returns that buffer to the operating system. If the requested data is not stored in non-volatile memory 150, the acceleration block device driver strategy routine passes the I/O request to the strategy routine of the appropriate peripheral device driver. The strategy routine for that device driver reads the data from the appropriate peripheral device.

If the acceleration block device driver receives a write request from the operating system, the strategy routine checks the chain of buf records to ascertain whether there is a buffer representing exactly the same peripheral device and the same block on that device stored in non-volatile memory 150. If such a buffer is stored in non-volatile memory 150 the buffer is reused. Otherwise, a new buffer is allocated in non-volatile memory 150. Then, the data contained in the request is copied from main memory 117B into stable memory 150.

Non-volatile memory 150 is operated by the strategy routine as a least recently used (LRU) cache. Hence, if a write request is received by the strategy routine and the constants, as described above, indicate that the non-volatile memory 150 is either full or the desired number of free buffers are not available, the buffers flushed from non-volatile memory 150 to the appropriate peripheral storage devices are the least recently used buffers in non-volatile memory 150.

The buf record data structure, as described above, is not maintained in stable storage 150 but the data represented by buffers are kept in stable storage 150. If the computer system crashes, as previously described, sufficient information is kept in stable storage 150 so that the data can be flushed to the appropriate peripheral device upon rebooting. However, no attempt is made to reconstruct the buf record data structure after a crash. This data structure is used only when the system is running normally and when a crash occurs the buf record data structure is simply reinitialized, as previously described.

An important aspect of this invention is that data are not randomly flushed from non-volatile memory 150. The most frequently used data are kept in memory 150 to the extent possible. This reduces the total amount of traffic to peripheral storage devices. This is especially important for filesystems since the same control block of a file is often written with each data block. The total disk traffic is actually reduced by keeping the control block in non-volatile memory 150 cache. In one embodiment, as each buffer in non-volatile memory 150 is used, the buffer is placed at the end of the list of buffers in the acceleration device. Hence, when buffers must be flushed, those buffers at the top of the list are flushed to the appropriate peripheral storage device.

Figure 7A:
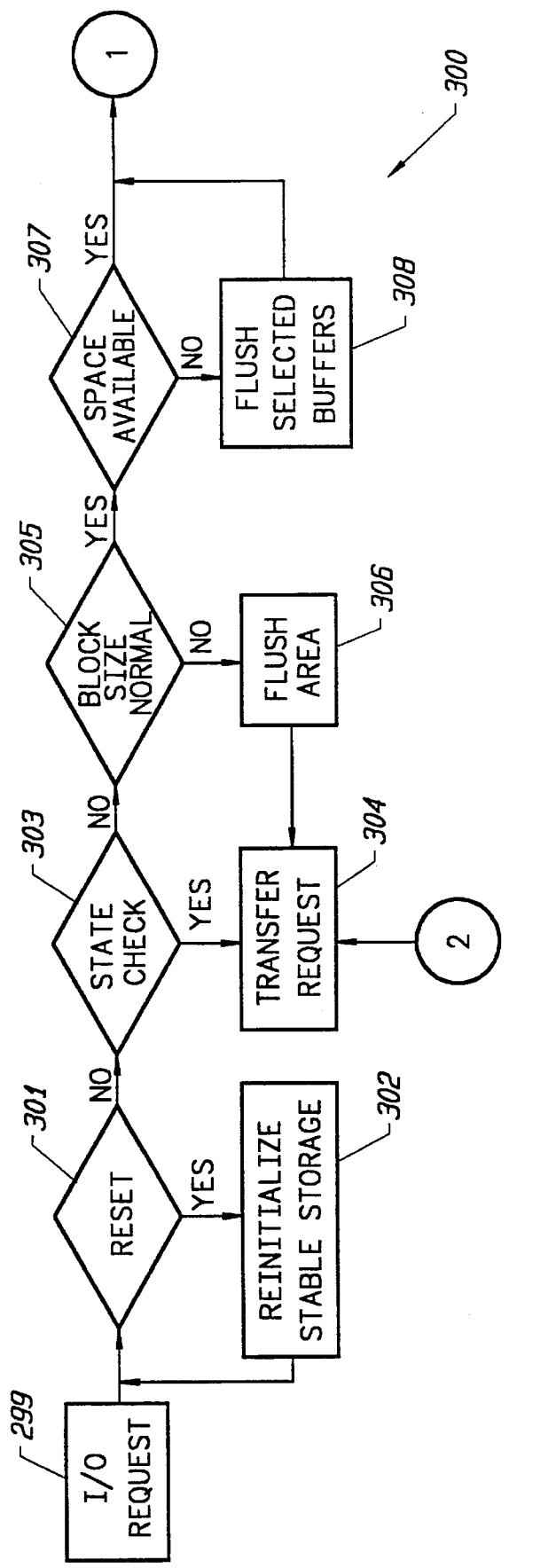
FIG. 7A and 7B illustrate a flow diagram for the strategy routine in the acceleration block device driver of this invention.
Figure 7B:
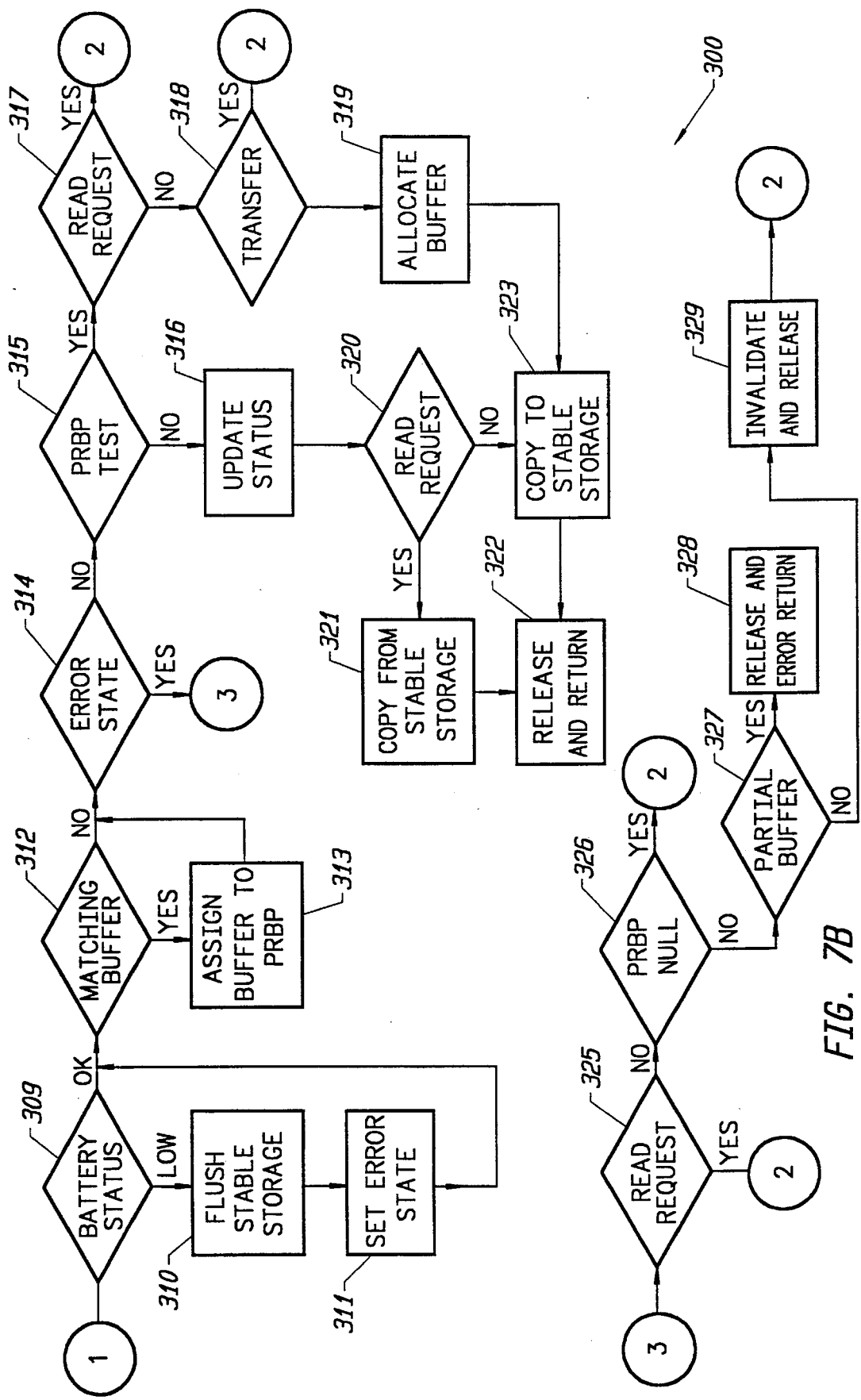

A flow diagram for the strategy routine of the acceleration block driver device of this invention is shown in FIG. 7. I/O request 299, which is issued by the operating system kernel, is, for example, either a read request or a write request for a filesystem which is located on a specific peripheral device. However, as described above, the operating system kernel has been configured so that for selected filesystems, the I/O request is intercepted by the strategy routine 300 of the acceleration block driver device.

Upon issuance of a request by I/O request 299, reset tests 301 determines whether the resetneeded flag, described above, is set. If the flag is set, processing transfers to initialize stable storage 302 which flushes non-volatile memory 150 (if the acceleration device is not in the ERROR state) and reinitializes the buf record structure for the acceleration device. Subsequently, the resetneeded flag is cleared, and processing returned to reset 301. Conversely, if the resetneeded flag is not set, reset test 301 passes processing to state check 303.

State check 303 determines (i) whether the acceleration device status is DOWN or (ii) whether the specified peripheral storage device is disabled. If either of these conditions is true, state check 303 transfers the I/O request to transfer request 304. Transfer request 304 sends the I/O request that has been received by strategy routine 300 to the peripheral device driver originally called by the user. If the acceleration device state is not DOWN and the peripheral device is not disabled, state check 303 passes processing to block size normal test 305.

Block size normal test 305 determines whether the block size specified by I/O request 299 is the normal block size, typically 8 K bytes, or whether the block request is an odd sized I/O request. If the I/O request is odd sized, block size normal test 305 transfers processing to flush area 306. Flush area 306 flushes a range of buffers from the non-volatile memory 150, which are located about the position of the requested data in the I/O request. This flushing is performed to assure that the data in the non-volatile memory 150 and the data on the disk are consistent. After flush area 306, the odd sized I/O request is sent to the peripheral device driver for the peripheral device specified in the I/O request through transfer request 304.

If the block size in the I/O request is normal, block size normal test 305 transfers processing to space available 307.

Space available 307 determines whether there is sufficient space in the non-volatile memory 150 to handle the I/O request. If sufficient space is not available, processing transfers to flush selected buffers 308 which tries to write the number of buffers defined by the variable "prewritenum" to the associated peripheral storage device so as to free up sufficient space for the I/O request.

Processing subsequently transfers to battery status test 309. Battery status test 309 determines whether the current battery voltage is sufficient to safely continue storing data in non-volatile memory 150. If the battery voltage is low, battery status test 309 transfers processing to flush stable storage 310 and subsequently to set error state 311. As previously described, these steps attempt to transfer any data in non-volatile memory 150 through to the appropriate peripheral storage device. After the error state is set by set error state 311, processing transfers to matching buffer 312.

Matching buffer 312 determines whether the device and the location on the device specified in the I/O request correspond to a buffer currently stored in non-volatile memory 150. If the buffer is stored in non-volatile memory 150 matching buffer 312 passes processing to assign buffer to PRBP 313. Assign buffer to PRBP 313 sets the variable PRBP to a value other than NULL. The buffer is also removed from the free list. Assign buffer to PRBP 313 subsequently passes processing to error state 314. Similarly, if the buffer is not found in non-volatile memory 150, matching buffer 312 transfers to error state 314.

If the acceleration device state is ERROR, error processing state 315 transfers processing to read request 325. Read request 325 ascertains whether the I/O request 299 was a read. Since the acceleration device is in the error state, any read request is sent to transfer request 304.

If the I/O request is not a read, processing transfers from read request 325 to PRBP null test 326. If PRBP is null, matching buffer 312 did not find the requested buffer in the non-volatile memory 150, and so processing transfers to transfer request 304 which continues processing, as previously described. Conversely, if PRBP null test 326 determines that PRBP is not null, processing transfers to partial buffer test 327.

Partial buffer test 327 ascertains whether the write request is for the entire buffer or for a region within the buffer. If the write request is only for a partial buffer, the buffer could contain valid data beyond that in the write request. In this case, to preserve as much data integrity as possible, partial buffer test 327 passes processing to release and error return 328 which in turn releases the buffer back to the free list and returns an error to the caller without invalidating the buffer. The valid data is not reclaimed since buffers on the free list are not necessarily invalidated and can still be referenced. However, if a full buffer is being written partial buffer test 327 passes control to invalidate and release 329.

Since a full buffer is being written, the buffer stored in memory is no longer of interest. Therefore, invalidate and release 329 invalidates the buffer in non-volatile memory 150 and releases the buffer back to the free list. Subsequently, the I/O request is transferred from invalidate and release 329 to transfer request 304.

Returning to error state 314, the above description assumed that an error was detected. However, if error state 314 does not detect an error, processing passes to PRBP test 315. If PRBP test determines that PRBP is null, processing transfers to read request 317. Read request 317 determines whether a read or write request was specified by I/O request 299. If read request 317 detects a read, the processing transfers the read request to the appropriate peripheral device driver through transfer request 304. Conversely, read request 317 transfers to transfer 318 if the I/O request was not a read request.

Transfer 318 checks to determine whether (i) the read-only flag for non-volatile memory 150 is set to true or (ii) the specified peripheral device is being flushed or (iii) the I/O request is an asynchronous I/O request. If any of these conditions are true, transfer 318 sends processing to transfer request 304. Otherwise, transfer 318 passes processing to allocate buffer 319. Allocate buffer 319 allocates a free buffer for the write request and processing transfers to copy to stable storage 323.

The final path in strategy is when PRBP test 315 determines that PRBP is not null so that a matching buffer exists in non-volatile memory 150. In this case, processing transfers to update status 316 which in turn updates the special registers which monitor the performance of the acceleration device.

Update status 316 subsequently passes processing to read request 320. If the I/O request is a read request, processing transfers from read request 320 to copy from stable storage 321 which in turn copies the requested buffer from stable storage 150 (FIG. 3) to main memory 117B. Processing subsequently goes to release and return 322 (FIG. 7) which releases the specified buffer to the end of the free list, performs the other cleanup operations required by UNIX for the hash list and related structures and then returns to the caller.

Conversely, if read request 320 detects a write request processing transfers to copy to stable storage 323 which in turn copies a buffer from main memory to stable storage and then transfers to release and return which performs a function similar to that described previously except the buffer is marked as "dirty."

Figure 8:
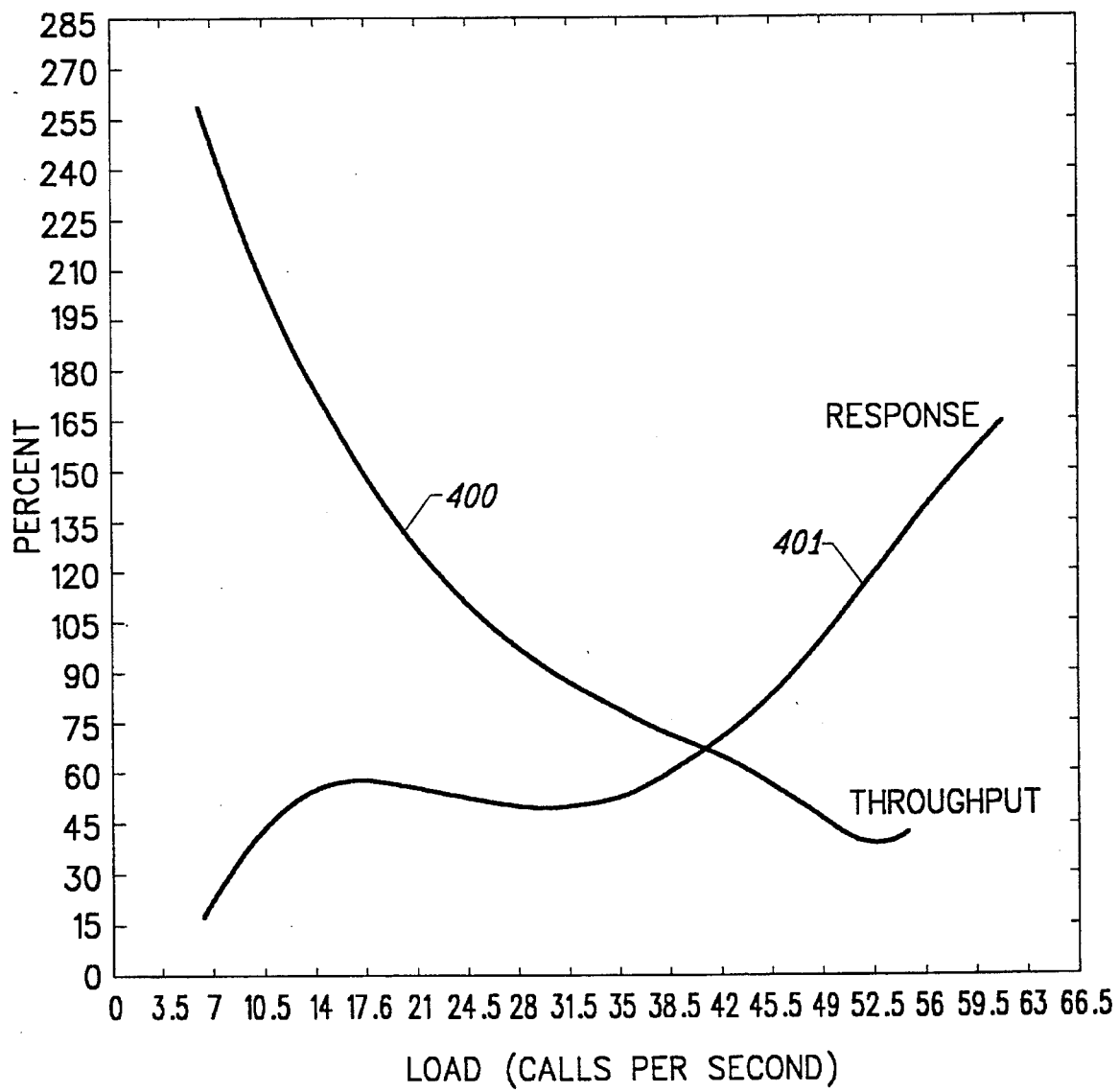
FIG. 8 demonstrates the ratio of the throughput and the ratio of the response of a computer system with the acceleration device driver of this invention and the same computer system without the acceleration device.

The strategy routine in the acceleration block device driver significantly enhances synchronous I/O in a computer system. Specifically, the total system performance in a synchronous I/O system may be improved by as much as 200 to 300 percent. As an example of the enhanced performance obtained using the acceleration device of this invention, a test case was run and the results are shown in FIG. 8. FIG. 8 has a first curve 400 which is throughput and a second curve 401 that is response. The horizontal axis is the load, in calls per second, on a server in an NFS network. The vertical axis is in percent improvement. For each load on the horizontal axis, curves 400, 401 represent the percentage of improvement for a server including the acceleration device of this invention over the same server without the acceleration device. FIG. 8 illustrates that when a server is placed under a given load of remote calls (statistically chosen to approximate true loads), the response time or throughput increases when the acceleration device is used in the server. Thus, for example, at a load of 40 calls per second to the server, the server with the acceleration device supports 65% more clients or delivers 70% better response time.

One of the reasons for the enhancement in performance shown in FIG. 8 is that in each synchronous write to a hard disk, the UNIX operating system performs at least two and maybe three writes to service a single NFS write request. A first write is done to a structure which keeps track of the various blocks of data and the second write is to the block of data itself. If multiple writes are done to the same file, each synchronous write repeatedly writes to the structure keeping track of the blocks of data and then writes a specific block of data. Accordingly, when these operations are moved to non-volatile memory 150, the first write is always to the same buffer and the second write is to a related region so that the amount of data actually transferred to disk is significantly reduced. Also, UNIX read caching is already quite effective so that write operations comprise a major portion of total disk traffic.

The embodiment of this invention described above for use with a UNIX operating system is not intended to limit the scope of the invention, but rather is intended to illustrate the principles of the invention. In view of the above description, one skilled in the art can add an acceleration device to computers operating under a different operating system.

The prior art methods for enhancing the performance of slow peripheral storage devices failed to provide both the synchronous write caching of this invention and the protection against computer crashes. Accordingly, the acceleration device provides a new capability in computer performance without requiring modification to the way users interact with the computer, moreover without requiring modification to the way the proprietary operating system interacts with the device drivers.

We claim:

1. In a computer system having a memory with a first access time, a peripheral storage device with a second access time, and a computer operating system that includes a peripheral storage device driver for synchronous transfer of information between said memory and said peripheral storage device, a synchronous operation acceleration device comprising:

stable storage with a third access time wherein said third access time is approximately on the same order of magnitude as said first access time, said stable storage coupled to said memory and said peripheral storage device; and control subsystem, included in said computer operating system, that transfers information to and from said stable storage, said control subsystem synchronously transferring data between said memory and said stable storage in response to a synchronous command from said computer operating system intended to transfer information to said peripheral storage device driver, and said control subsystem transferring a selected portion of said data from said stable storage to said peripheral storage device driver upon a user command.

2. The synchronous operation acceleration device of claim 1 wherein said user command includes a command to unmount said peripheral storage device.

3. The synchronous operation acceleration device of claim 1 wherein said user command includes a command to shutdown said computer system.

4. The synchronous operation acceleration device of claim 1 wherein said stable storage is a non-volatile memory.

5. The synchronous operation acceleration device of claim 4 wherein said stable storage is a cache with least-recently-used data replacement.

6. The synchronous operation acceleration device of claim 1 wherein said control subsystem comprises a device driver for said stable storage wherein said stable storage device driver is different from said peripheral storage device driver.

7. The synchronous operation acceleration device of claim 6 wherein said stable storage device driver intercepts a synchronous write command which is intended for said peripheral storage device driver, and said stable storage device driver, in response to said synchronous write command, synchronously copies data, specified in said synchronous write command, from said memory of said computer system to said stable storage.

8. In a computer system having a peripheral storage device operatively coupled to said computer system, CPU, main memory having a first access time, stable storage having a second access time, and a computer operating system including a peripheral storage device driver for said peripheral storage device, a method for enhancing synchronous I/O operations in said computer system comprising:

transferring data, specified in selected synchronous I/O operations intended for said peripheral storage device driver, between said stable storage and said main memory using an acceleration device driver contained in said computer operating system, wherein said second access time is approximately on the same order of magnitude as said first access time; and transferring a selected portion of said data from said stable storage to said peripheral storage device using said acceleration device driver upon a user command.

9. The method of claim 8 wherein said user command includes a command to unmount said peripheral storage device.

10. The method of claim 8 wherein said user command includes a command to shutdown said computer system.

11. In a computer system having a memory with a first access time, a peripheral storage device with a second access time, and a computer operating system that includes a peripheral storage device driver for synchronous transfer of information between said memory and said peripheral storage device, a synchronous operation acceleration device comprising:

stable storage with a third access time wherein said third access time is approximately on the same order of magnitude as said first access time, said stable storage coupled to said memory and said peripheral storage device;

power supply that provides power to said stable storage, said power supply coupled to said stable storage; and control subsystem, included in said computer operating system, that transfers information to and from said stable storage, said control subsystem synchronously transferring data between said memory and said stable storage in response to a synchronous command from said computer operating system intended to transfer information to said peripheral storage device driver, and said control subsystem transferring a selected portion of said data from said stable storage to said peripheral storage device driver upon a change in said power supply.

12. The synchronous operation acceleration device of claim 11 wherein said power supply is a battery.

13. The synchronous operation acceleration device of claim 12 wherein said change is the charge in said battery becoming low.

14. The synchronous operation acceleration device of claim 11 wherein said stable storage is a non-volatile memory.

15. The synchronous operation acceleration device of claim 14 wherein said stable storage is a cache with least-recently-used data replacement.

16. The synchronous operation acceleration device of claim 11 wherein said control subsystem comprises a device driver for said stable storage wherein said stable storage device driver is different from said peripheral storage device driver.

17. The synchronous operation acceleration device of claim 16 wherein said stable storage device driver intercepts a synchronous write command which is intended for said peripheral storage device driver, and said stable storage device driver, in response to said synchronous write command, synchronously copies data, specified in said synchronous write command, from said memory of said computer system to said stable storage.

18. In a computer system having a peripheral storage device operatively coupled to said computer system, CPU, main memory having a first access time, stable storage having a second access time, power supply coupled to said stable storage, and a computer operating system including a peripheral storage device driver for said peripheral storage device, a method for enhancing synchronous I/O operations in said computer system comprising:

transferring data, specified in selected synchronous I/O operations intended for said peripheral storage device driver, between said stable storage and said main memory using an acceleration device driver contained in said computer operating system, wherein said second access time is approximately on the same order of magnitude as said first access time; and transferring a selected portion of said data from said stable storage to said peripheral storage device using said acceleration device driver upon a change in said power supply.

19. The method of claim 18 wherein said power supply is a battery.

20. The method of claim 19 wherein said change is the charge in said battery becoming low.

* * * * *